Patented May 14, 1946

2,400,380

UNITED STATES PATENT OFFICE 2,400,380

CHEMICAL COMPOUND AND METHOD

Oskar Wintersteiner, New Brunswick, N. J., assignor to E. R. Squibb & Sons, New York, N. Y., a corporation of New York No Drawing. Application January 2, 1942, Serial No. 425,418

7 Claims. (Cl. 260—397.2)

This invention relates to the production of derivatives of 3-hydroxy-$\Delta^5$-steroids, and especially to the production of provitamin $D_3$ and related products.

It has long been known that products giving the Rosenheim and Lifschütz color reactions are formed on oxygenation of cholesterol, particularly in stabilized aqueous colloidal solution, but the nature of these substances, generally called "oxycholesterols," has not heretofore been established.

I have found that the principal products formed by the oxygenation of cholesterol in stabilized aqueous colloidal solution are 7($\alpha$)-hydroxycholesterol, 7($\beta$)-hydroxycholesterol, and 7-ketocholesterol; and the discovery has enabled utilization of this (oxygenation) reaction for producing 7-dehydrocholesterol (provitamin $D_3$) as well as for obtaining the intermediate epimeric mixture of 7-hydroxycholesterols or 7-ketocholesterol per se. I have further found that position 7 in 3-hydroxy-$\Delta^5$-steroids generally is thus affected by molecular oxygen, and that by means of this reaction many and varied derivatives of 3-hydroxy-$\Delta^5$-steroids may be readily prepared. Provitamin $D_3$, thus obtained, can be readily activated by ultraviolet light or other physico-chemical means to provide an antirachitic agent.

It is an object of this invention to provide simple and efficient methods of preparing 3-oxy-$\Delta^5$-7-dehydro-steroids, especially 7-dehydrosterols. And it is a further object of this invention to provide simple and efficient methods of preparing 3-oxy-$\Delta^5$-7-oxy-steroids and of preparing 3-oxy-$\Delta^5$-7-keto-steroids.

The methods of this invention essentially comprise oxygenating a stabilized aqueous colloidal solution of a 3-hydroxy-$\Delta^5$-steroid, and (a) converting the thereby-obtained 3-hydroxy-$\Delta^5$-7-hydroxy-steroid into a 3-oxy-$\Delta^5$-7-dehydro-steroid, or (b) recovering 3-oxy-$\Delta^5$-7-oxy-steroids and/or a 3-oxy-$\Delta^5$-7-keto-steroid from the reaction product. In the preparation of a 3-oxy-$\Delta^5$-7-dehydro-steroid, the 3-hydroxy-$\Delta^5$-7-hydroxy-steroid may be recovered from the reaction mixture and converted into the corresponding 3-oxy-$\Delta^5$-7-dehydro-steroid; or (alternatively) the crude reaction mixture may be subjected to a reduction treatment to convert the 7-keto component into the corresponding 7-hydroxy compound and the reduced product converted into the corresponding 3-oxy-$\Delta^5$-7-dehydro-steroid. In the production of 3-oxy-$\Delta^5$-7-oxy-steroids or 3-oxy-$\Delta^5$-7-keto-steroids per se, the oxidation may be regulated (e. g., by means of catalysts, variation of temperature, etc.) to favor the production of either type of reaction product; thus oxygenation at a temperature below about 50° C. markedly favors the production of the keto compounds.

By "oxygenation" is meant, of course, oxidation by means of molecular oxygen, as effected, for example, by intimately contacting the solution with air or oxygen; and the term "stabilized" has reference to the peptization of the colloidal solution or its maintenance in a state of high dispersion, as effected, for example, by inclusion of a dispersing or emulsifying agent and, if necessary, an organic solvent.

The 3-hydroxy-$\Delta^5$-steroids utilizable in the practice of this invention include, inter alia, the unsaturated bile acids of this structure (e. g. 3-hydroxy-$\Delta^5$-cholenic acid) and the neutral or acidic sterols of this structure (e. g. cholesterol, stigmasterol, sitosterol and ergosterol).

The following examples are illustrative of the invention.

Example 1

A colloidal solution of cholesterol is prepared by adding 5 g. cholesterol (dissolved in 150 cc. hot ethanol) to 1 liter water containing 0.5–1 g. sodium stearate, and the solution is aerated for several hours at 85° C., while stirring. The solution is then acidified with hydrochloric acid, and extracted with ether; and the soap is removed from the ether solution by extraction with aqueous potassium hydroxide. The residue from the dried ether solution (5.2 g.) contains about 45% 7-ketocholesterol and about 30% of a mixture of the two epimeric ($\alpha$- and $\beta$-) 7-hydroxycholesterols.

The ketone is removed from the residue by means of Girard's Reagent T, and the non-ketonic fraction (essentially 7-hydroxycholesterols and unchanged cholesterol) is treated to convert the 7-hydroxycholesterols into the corresponding diacylated compounds (inter alia, the diacetate and dibenzoate); e. g. the fraction is reacted with acetic anhydride and pyridine, and the 7-hydroxycholesterol acetates are recovered by adsorption from pentane solution on $Al_2O_3$ and fractional elution with pentane-benzene mixtures.

The mixture of 7-hydroxycholesterol esters may then be converted into 7-dehydro-cholesterol by dehydration methods well known in the art (e. g. the methods disclosed in U. S. Patents 2,098,984 and 2,209,934). Alternatively, the mixture of 7-hydroxycholesterol esters may be first converted into a mixture of 7-hydroxycholesterols by hydrolysis, and the resulting 7-hydroxycholesterols converted into 7-dehydrocholesterol by methods well known in the art (e. g. the method disclosed in U. S. Patent 2,098,984).

If 7-ketocholesterol per se is the desired product, it may be recovered (liberated) from its combination with the Girard reagent by conventional means; and if the 7-hydroxycholesterols are the desired products, they may be recovered from their esters by conventional means, e. g. hydrolysis with alkali.

*Example 2*

The procedure of Example 1 is repeated using stigmasterol instead of cholesterol. The residue from the dried ether solution contains about 20% 7-ketostigmasterol and about 15% of a mixture of epimeric 7-hydroxy-stigmasterols. This residue is treated in the manner described in Example 1 to obtain, as desired, 7-dehydrostigmasterol, 7-ketostigmasterol, 7-hydroxy-stigmasterols, or esters of the latter. The 7-ketostigmasterol, which has been obtained previously only as the acetate, melts at 137° C.

*Example 3*

A colloidal solution of cholesterol is prepared as detailed in Example 1 and air is slowly bubbled therethrough at 37° C. for 5-7 days. Under these conditions, practically all of the cholesterol is converted into 7-oxygenated derivatives, the residue from the dried ether solution containing about 70% 7-ketocholesterol and about 30% of a mixture of the two epimeric 7-hydroxycholesterols.

The ketone and diols may be separated from each other as detailed in Example 1, and the 7-hydroxycholesterol esters then converted into 7-dehydrocholesterol. However, since practically all of the cholesterol is converted under the conditions of this example into compounds having oxygen in the 7 position, the crude reaction product itself may be used for the production of 7-dehydrocholesterol. Thus, the crude reaction product is quantitatively converted into 7-hydroxy-cholesterols by reaction with aluminum isopropylate (or equivalent reducing agent), and the 7-hydroxycholesterols converted into 7-dehydrocholesterol.

Because of the high proportion of 7-ketocholesterol formed, the conditions of Example 3 are preferred where the production of 7-ketocholesterol per se is intended.

Preferably, the aqueous colloidal solution to be oxygenated has a slightly alkaline reaction (e. g. a pH between 7 and 8). Among the utilizable dispersing agents are: soaps (alkali salts of saturated or unsaturated fatty acids); alkali salts of bile acids (e. g. sodium cholate); and neutral detergents or wetting agents (e. g. sodium lauryl sulfate). When the 3-hydroxy-$\Delta^5$-steroid to be oxygenated has acidic properties (as have, for example, the unsaturated bile acids), a neutral detergent such as sodium lauryl sulfate is preferred because it can be more readily removed than the soaps. Obviously no emulsifying agent is needed if the 3-hydroxy-$\Delta^5$-steroid to be oxygenated is an acid whose alkali salts have soap-like properties (e. g. 3-hydroxy-$\Delta^5$-cholenic acid).

Manifestly, the crude or partially purified unsaponifiable fraction of natural (sterol-containing) oils may be used instead of the sterols per se in the practice of this invention.

The invention may be variously otherwise embodied within the scope of the appended claims.

I claim:

1. The method of preparing a 3-oxy-$\Delta^5$-7-oxy-steroid, which comprises intimately contacting with molecular oxygen a stabilized aqueous colloidal solution of an unesterified 3-hydroxy-$\Delta^5$-steroid, removing the formed 3-hydroxy-$\Delta^5$-7-keto steroid from the reaction product, and recovering a 3-oxy-$\Delta^5$-7-oxy-steroid from the residue.

2. The method of preparing a 3-oxy-$\Delta^5$-7-oxy-steroid, which comprises intimately contacting with molecular oxygen a stabilized aqueous colloidal solution of an unesterified 3-hydroxy-$\Delta^5$-steroid, removing the formed 3-hydroxy-$\Delta^5$-7-keto steroid from the reaction product, acylating the reaction product, and separating the acylated 3-hydroxy-$\Delta^5$-7-hydroxy-steroids from the reaction product.

3. The method of preparing a 3-oxy-$\Delta^5$-7-oxy-steroid, which comprises intimately contacting with molecular oxygen a stabilized aqueous colloidal solution of an unesterified 3-hydroxy-$\Delta^5$-steroid, removing the formed 3-hydroxy-$\Delta^5$-7-keto steroid from the reaction product, acetylating the reaction product, and recovering the acetylated 3-hydroxy-$\Delta^5$-7-hydroxy-steroids from the reaction product by adsorption and fractional elution.

4. The method of preparing a 3-oxy-$\Delta^5$-7-keto-steroid which comprises intimately contacting with molecular oxygen a stabilized aqueous colloidal solution of an unesterified 3-hydroxy-$\Delta^5$-steroid, and recovering the 3-hydroxy-$\Delta^5$-7-keto-steroid from the reaction product.

5. The method of preparing a 3-oxy-$\Delta^5$-7-keto-steroid which comprises intimately contacting with molecular oxygen a stabilized aqueous colloidal solution of an unesterified 3-hydroxy-$\Delta^5$-steroid at a temperature below about 50° C., and recovering the 3-hydroxy-$\Delta^5$-7-keto-steroid from the reaction product.

6. The method of preparing a 3-oxy-$\Delta^5$-7-dehydro-steroid, which comprises intimately contacting with molecular oxygen a stabilized aqueous colloidal solution of an unesterified 3-hydroxy-$\Delta^5$-steroid, subjecting the reaction product to a reduction treatment to convert the 7-keto component into the corresponding 7-hydroxy compound, and converting the reduced product into a 3-oxy-$\Delta^5$-7-dehydro-steroid.

7. The method of preparing a 3-oxy-$\Delta^5$-7-oxy-steroid which comprises intimately contacting with molecular oxygen a stabilized aqueous colloidal solution of an unesterified 3-hydroxy-$\Delta^5$-steroid, and subjecting the reaction product to a reduction treatment to convert the 7-keto-component into the corresponding 7-hydroxy compound.

OSKAR WINTERSTEINER.